Dec. 16, 1958 V. G. TOWNSEND 2,864,883
SEALED CONDUIT FOR ELECTRICAL CONDUCTORS
Filed Nov. 13, 1953

INVENTOR
VERNON G. TOWNSEND
BY
ATTORNEYS

United States Patent Office 2,864,883
Patented Dec. 16, 1958

2,864,883

SEALED CONDUIT FOR ELECTRICAL CONDUCTORS

Vernon G. Townsend, Minneapolis, Minn., assignor, by mesne assignments, to the United States of America as represented by the Secretary of the Navy Application November 13, 1953, Serial No. 392,069

1 Claim. (Cl. 174—151)

This invention relates to a conduit for electrical conductors and more particularly to a means for sealing the passageway of electrical conductors in a body of insulating material.

It is an object of this invention to provide a novel fluid tight seal for conduits carrying electrical conductors through insulating bodies.

Another object of this invention is to provide an improved means for preventing the passage of water through an opening in an insulating body through which opening an electrical conductor extends.

Other objects and advantages of the invention will hereinafter become more fully apparent from the following description of the annexed drawings, which illustrate a preferred embodiment, and wherein.

Figure 1:
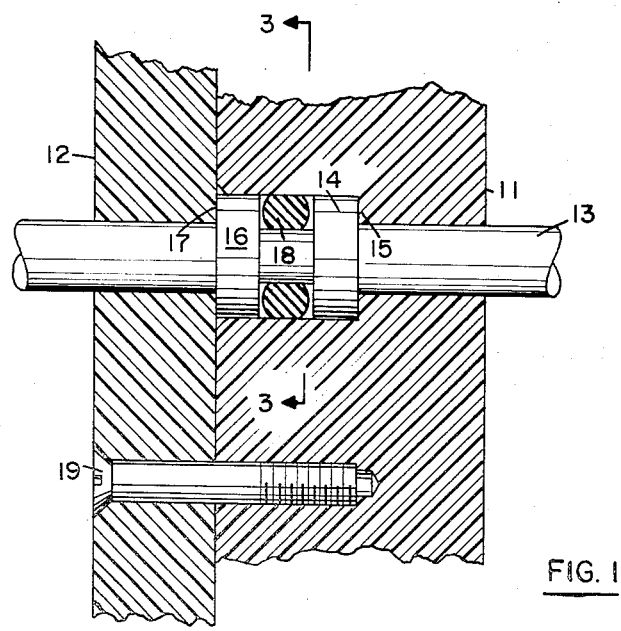
Fig. 1 is a sectional view of an electrical conductor extending through a conduit in a body of insulating material and of the means for sealing the conduit against the penetration of water along said conductor.

Referring now to the drawings, the reference numeral 11 designates a base or sheet of insulating material such as a phenolic resin having a perforation through which an electrical conductor 13 extends. The conductor 13 has a flange 14 which bears against a shoulder 15, formed by an enlarged portion of the perforation in the base 11, and a second flange 16 which is spaced from the flange 14. A rubber O-ring 18 is positioned between the flanges 14 and 16 and is compressed by the base 11 to form a fluid tight seal between the conductor 13 and the base 11. A cover plate 12, also of electrically insulating material, has a perforation mating with the perforation in the base 11 and abuts the base 11 along one face thereof. The cover plate 12 engages the flange 16 at 17 to maintain the conductor 13 in position and is held against the base 11 by a screw 19.

Figure 2:
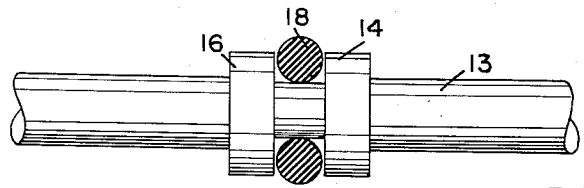
Fig. 2 is a view of the conductor and gasket of Fig. 1 prior to its insertion into the body of insulating material.
Figure 3:
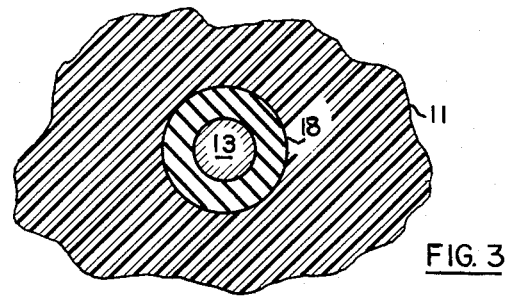
Fig. 3 is a sectional view of the device of Fig. 1 taken along the line 3—3.

Fig. 2 shows the conductor 13 and the O-ring 18 prior to their insertion in the base 11, the O-ring 18 being in its uncompressed state and extending beyond the periphery of the flanges 14 and 16. Fig. 3 shows the relationships of the conductor 13, the O-ring 18 and the base 11.

In many installations, such as in the connection of electrical apparatus on board a ship with electrical apparatus outside the ship and beneath the water line, it is necessary to provide means for passing electrical conductors through a wall and to seal the passage against penetration by water. This invention has particular application in such similar apparatus since it has proved capable of withstanding hydrostatic pressure of up to 500 lbs. p. s. i. without leaking along the conductor.

Obviously many modifications and variations of the present invention are possible in the light of the above teachings. It is therefore to be understood that within the scope of the appended claim the invention may be practiced otherwise than as specifically described.

What is claimed is:

An electrical connector for lead wires which comprises a base of insulating material having a passageway extending therethrough between its front and rear faces, said passageway being formed of an enlarged diameter bore extending inwardly from its rear face and a reduced diameter bore extending inwardly from its front face providing an internal shoulder within the base, an electrical conductor positioned within said passageway and having front and rear lead connecting end portions extending outwardly from said front and rear faces, said front connecting end portion being in tight fitting engagement with the small diameter bore of the passageway, said conductor having co-extensive front and rear annular flanges thereon with their peripheries in contact with the enlarged bore of the passageway and providing an annular groove between the inner walls of the flanges, said front annular flange having its outer wall positioned in contact with the internal shoulder of the passageway and said rear annular flange having its outer wall positioned in the plane of the rear face of the base, a packing ring of resilient material within said annular groove having its outer periphery in contact with the enlarged bore of the passageway and providing a seal therewith, a cover plate having a passageway extending therethrough between its inner and outer faces for receiving the rear lead connecting end portion of the conductor in tight fitting engagement therewith and means for securing the cover plate to the base and positioning the inner face of the cover plate in surface contact with both the outer wall of the rear annular flange and the rear face of the base.

References Cited in the file of this patent

UNITED STATES PATENTS

| | | |
|---|---|---|
| 2,422,379 | Westman | June 17, 1947 |
| 2,444,119 | Thorn et al. | June 29, 1948 |
| 2,658,130 | Bondurant | Nov. 3, 1953 |
| 2,672,500 | Bondon | Mar. 16, 1954 |